United States Patent
Tso et al.

(10) Patent No.: US 8,005,750 B1
(45) Date of Patent: *Aug. 23, 2011

(54) METHOD AND SYSTEM FOR PROVIDING PRINCIPAL PROTECTION EXPOSURE TO EQUITY MARKETS

(75) Inventors: Yi Tso, Jersey City, NJ (US); John Vitha, North Woodmere, NY (US); Timothy Bridges, Summit, NJ (US); Michael Millette, Larchmont, NY (US); Radcliffe J. Smith, North Caldwell, NJ (US); Richard Andrade, Holmdel, NJ (US)

(73) Assignee: Goldman Sachs & Co., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/728,855

(22) Filed: Mar. 22, 2010

Related U.S. Application Data

(63) Continuation of application No. 10/615,250, filed on Jul. 8, 2003, now Pat. No. 7,716,111.

(51) Int. Cl.
*G06Q 40/00* (2006.01)

(52) U.S. Cl. ........................................... 705/37

(58) Field of Classification Search .................... 705/14, 705/35, 36 R, 37; 713/156–160, 168–175; 707/609
See application file for complete search history.

(56) References Cited

U.S. PATENT DOCUMENTS

| | | | |
|---|---|---|---|
| 5,809,484 A * | 9/1998 | Mottola et al. | 705/36 R |
| 2002/0059123 A1 * | 5/2002 | Dunning et al. | 705/35 |
| 2002/0138396 A1 * | 9/2002 | Brown et al. | 705/37 |

OTHER PUBLICATIONS

*Hecht v. Malley*, 265 U. S. 144 (1924), Supreme Court of the United States, p. 146-147.*
Securities Act File No. 333-83085 filed by The Market Participation Principal Protection Fund Inc, Jul. 16, 1999.*
The Delaware Business Trust Act by Eric A. Mazie, Jan. 9, 2000.*
Chicago Board of Trade, Comodity Trading manual, 1994, Glenlake Publishing Company Ltd. p. 95-97, 325-328.*
Trudy Ring's Article Abstract 'European' Settlement Draws Funds' Interest, published in Pension & Investment Age, May 12, 1986, vol. 14, Iss 10, p. 41-42, retrieved from Proquest Jul. 2, 2008.*

* cited by examiner

*Primary Examiner* — Mary Cheung
(74) *Attorney, Agent, or Firm* — Chadbourne & Parke LLP; John A. Squires

(57) ABSTRACT

Various embodiments of the present invention relate to methods and systems for providing principal protection exposure to equity markets. More particularly, one embodiment of the present invention relates to a computer implementable method for performing data processing operations associated with providing principal protection exposure to an equity market, comprising the steps of: carrying out a sale of a trust certificate to generate proceeds, which sale is from a trust to a first entity; allocating a portion of the proceeds of the sale of the trust certificate to a purchase of an equity security, which purchase is by the trust from the equity market; and allocating a portion of the proceeds of the sale of the trust certificate to a purchase of a put option on the equity security, which purchase is by the trust from a second entity; wherein the sale of the trust certificate to the first entity, combined with the purchase of the equity security by the trust and the purchase of the put option by the trust, provides the first entity principal protection exposure to the equity market without causing substantial income statement volatility.

25 Claims, 1 Drawing Sheet

METHOD AND SYSTEM FOR PROVIDING PRINCIPAL PROTECTION EXPOSURE TO EQUITY MARKETS

CROSS-REFERENCE TO RELATED APPLICATIONS

This application is a continuation of and hereby claims priority to, pending U.S. patent application Ser. No. 10/615,250, entitled "Method and System for Providing Principal Protection Exposure to Equity Markets," filed on Jul. 8, 2003, which claims the benefit under 35 U.S.C. 119(e) of U.S. Provisional Application Ser. No. 60/394,388, filed Jul. 8, 2002. The entire contents of the aforementioned applications are herein expressly incorporated by reference.

FIELD OF THE INVENTION

Various embodiments of the present invention relate to methods and systems for providing principal protection exposure to equity markets. More particularly, one embodiment of the present invention relates to a computer implementable method for performing data processing operations associated with providing principal protection exposure to an equity market, comprising the steps of: carrying out a sale of a trust certificate to generate proceeds, which sale is from a trust to a first entity; allocating a portion of the proceeds of the sale of the trust certificate to a purchase of an equity security, which purchase is by the trust from the equity market; and allocating a portion of the proceeds of the sale of the trust certificate to a purchase of a put option on the equity security, which purchase is by the trust from a second entity; wherein the sale of the trust certificate to the first entity, combined with the purchase of the equity security by the trust and the purchase of the put option by the trust, provides the first entity principal protection exposure to the equity market without causing substantial income statement volatility (i.e., due to the terms of the trust certificate; the by-laws, rules, and regulations of the trust; and the put option).

For the purposes of the present application the term "entity" is intended to refer to any person, organization, or group.

Further, for the purposes of the present application the term "security" is intended to refer to an instrument evidencing debt and/or ownership of asset(s).

Figure 1:
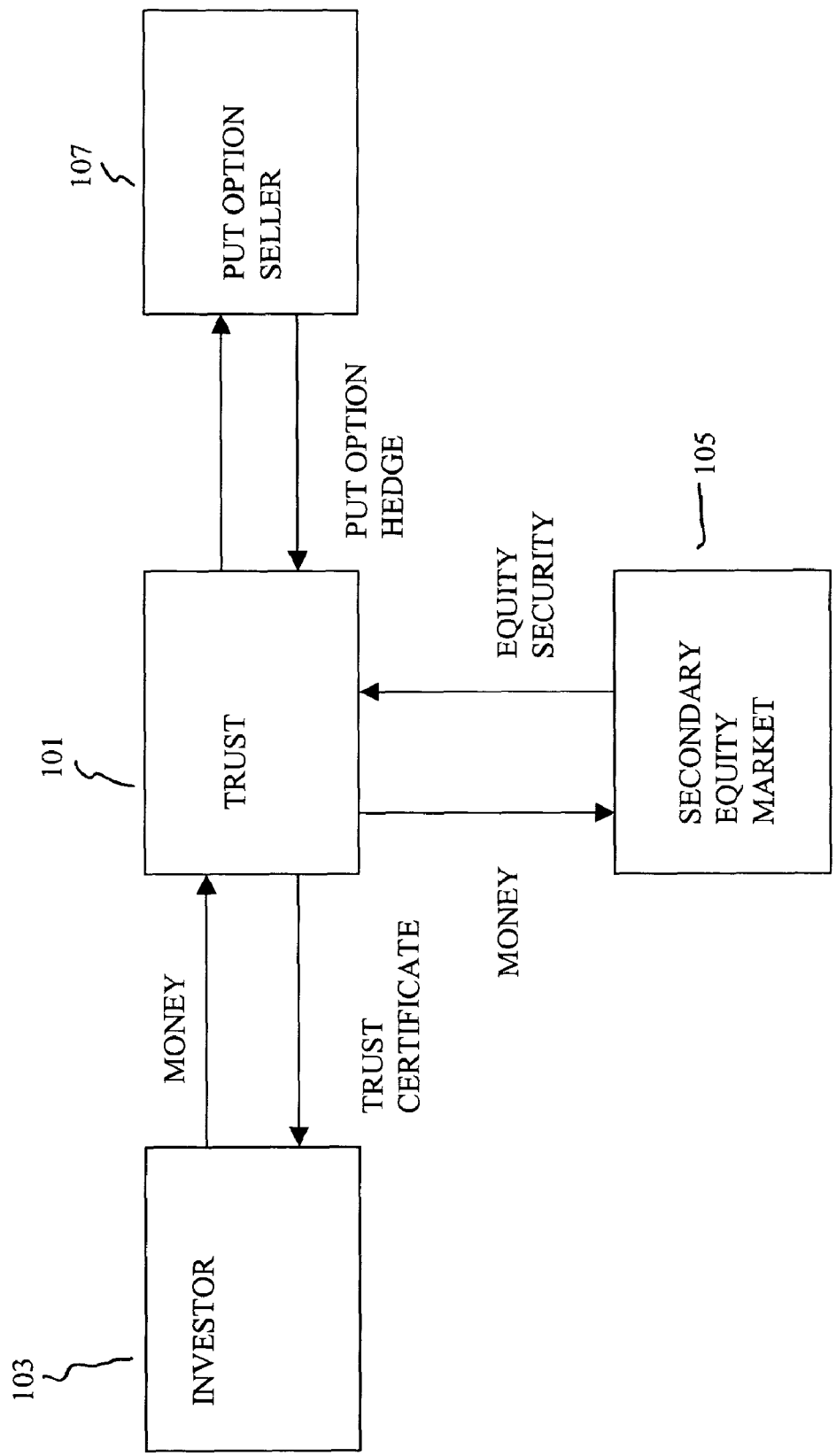
FIG. 1 shows data processing operations and a financial structure associated with an embodiment of the present invention.

Among those benefits and improvements that have been disclosed, other objects and advantages of this invention will become apparent from the following description taken in conjunction with the accompanying FIGURE. The FIGURE constitutes a part of this specification and includes illustrative embodiments of the present invention and illustrates various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

In one embodiment of the present invention a computer implementable method for performing data processing operations associated with providing principal protection exposure to an equity market is provided, comprising the steps of: carrying out a sale of a trust certificate to generate proceeds, which sale is from a trust to a first entity; allocating a portion of the proceeds of the sale of the trust certificate to a purchase of an equity security, which purchase is by the trust from the equity market; and allocating a portion of the proceeds of the sale of the trust certificate to a purchase of a put option on the equity security, which purchase is by the trust from a second entity; wherein the sale of the trust certificate to the first entity, combined with the purchase of the equity security by the trust and the purchase of the put option by the trust, provides the first entity principal protection exposure to the equity market without causing substantial income statement volatility.

In one example the principal protection exposure may be provided to the first entity with substantially no income statement volatility.

In another example the principal protection exposure may be provided to the first entity with RP1 risk-based capital treatment.

In another example substantially all of the proceeds of the sale of the trust certificate may be allocated between the purchase of the equity security and the purchase of the put option on the equity security.

In another example the method may further comprise structuring the trust.

In another example substantially all of the proceeds of the sale of the trust certificate may be allocated among the purchase of the equity security, the purchase of the put option on the equity security, and formation and administration costs associated with the trust.

In another example the method may further comprise structuring the trust as a trust selected from the group including, but not limited to: (a) a limited purpose Delaware business trust; and (b) a limited purpose New York business trust.

In another example the method may further comprise selecting a trustee for the trust.

In another example the method may further comprise selecting an independent bank trustee to serve as trustee for the trust.

In another example the equity security may be an SPDR share.

In another example the put option may be struck at a price that substantially guarantees at least the return of the initial investment by the first entity at the maturity of the put option.

In another example the put option may be an over-the-counter put option.

In another example the put option may be a European-style cash-settling option.

In another example the steps may be carried out in the order recited.

In another embodiment a computer implementable method for performing data processing operations associated with providing principal protection exposure to an equity market is provided, comprising the steps of: structuring a trust; selecting a trustee for the trust; carrying out a sale of a trust certificate to generate proceeds, which sale is from the trust to a first entity; allocating a portion of the proceeds of the sale of the trust certificate to a purchase of an equity security, which purchase is by the trust from the equity market; and allocating a portion of the proceeds of the sale of the trust certificate to a purchase of a put option on the equity security, which purchase is by the trust from a second entity; wherein substantially all of the proceeds of the sale of the trust certificate are allocated among the purchase of the equity security, the purchase of the put option on the equity security, and formation and administration costs associated with the trust; and wherein the sale of the trust certificate to the first entity, combined with the purchase of the equity security by the trust and the purchase of the put option by the trust, provides the first entity principal protection exposure to the equity market without causing substantial income statement volatility.

In one example the principal protection exposure may be provided to the first entity with substantially no income statement volatility.

In another example the principal protection exposure may be provided to the first entity with RP1 risk-based capital treatment.

In another example the method may further comprise structuring the trust as a trust selected from the group including, but not limited to: (a) a limited purpose Delaware business trust; and (b) a limited purpose New York business trust.

In another example the method may further comprise selecting an independent bank trustee to serve as trustee for the trust.

In another example the equity security may be an SPDR share.

In another example the put option may be struck at a price that substantially guarantees at least the return of the initial investment by the first entity at the maturity of the put option.

In another example the put option may be an over-the-counter put option.

In another example the put option may be a European-style cash-settling option.

In another example the steps may be carried out in the order recited.

In another embodiment a financial structure for providing principal protection exposure to an equity market is provided, comprising: a trust certificate, which trust certificate is sold by a trust to a first entity to generate proceeds; an equity security, which equity security is purchased by the trust from the equity market using a portion of the proceeds of the sale of the trust certificate; and a put option on the equity security, which put option is purchased by the trust from a second entity using a portion of the proceeds of the sale of the trust certificate; wherein the trust certificate sold to the first entity, combined with the equity security purchased by the trust and the put option purchased by the trust, provides the first entity principal protection exposure to the equity market without causing substantial income statement volatility.

In one example the principal protection exposure may be provided to the first entity with substantially no income statement volatility.

In another example the principal protection exposure may be provided to the first entity with RP1 risk-based capital treatment.

In another example substantially all of the proceeds of the sale of the trust certificate may be allocated between the purchase of the equity security and the purchase of the put option on the equity security.

In another example substantially all of the proceeds of the sale of the trust certificate may be allocated among the purchase of the equity security, the purchase of the put option on the equity security, and formation and administration costs associated with the trust.

In another example the trust may be selected from the group including, but not limited to: (a) a limited purpose Delaware business trust; and (b) a limited purpose New York business trust.

In another example an independent bank trustee may serve as trustee for the trust.

In another example the equity security may be an SPDR share.

In another example the put option may be struck at a price that substantially guarantees at least the return of the initial investment by the first entity at the maturity of the put option.

In another example the put option may be an over-the-counter put option.

In another example the put option may be a European-style cash-settling option.

Referring now to FIG. 1, one embodiment of the present invention is shown. As seen in this FIG. 1, Trust 101 is created. In one example (which example is intended to be illustrative and not restrictive) Trust 101 may be a limited purpose Delaware Business Trust or a limited purpose New York Business Trust. In another example (which example is intended to be illustrative and not restrictive) Trust 101 may qualify as a grantor trust. In another example (which example is intended to be illustrative and not restrictive) an independent bank trustee may be selected to serve as Trustee of the Trust.

Still referring to this FIG. 1, it is seen that Investor 103 buys a Trust Certificate from Trust 101 and Trust 101 buys a fully-paid-for equity security from secondary equity market 105. In one example (which example is intended to be illustrative and not restrictive) the equity security may be a "Standards and Poor's Depository Receipts," an exchange-traded fund share ("SPDR share"). In addition, Trust 101 buys a Put Option from Put Option Seller 107. In one example (which example is intended to be illustrative and not restrictive) the Put Option is an over-the-counter ("OTC") Put Option. In another example (which example is intended to be illustrative and not restrictive) the Put Option is written on the same Equity Security held by Trust 101 and is struck at a price that should guarantee at least the return of initial investment money to Investor 103 at maturity of the Put Option.

Of note, the economics realized by Investor 103 may reflect the formation and/or administration costs associated with Trust 101 and/or may incorporate a structuring fee.

Of further note, the Trust Certificate bought by Investor 103 (which Trust Certificate may include the power of Trust 101 to buy the Equity Security and Put Option and/or may refer to the bylaws, rules, and/or regulations of the Trust) may sometimes be referred to as a "PROTEQTS" or "PROTEQTS security".

Referring now to Table 1, an example scenario analysis (which example is intended to be illustrative and not restrictive) in connection with a PROTEQTS is shown:

TABLE 1

| | |
|---|---|
| Maturity | 10 years |
| Underlier | SPDRs |
| SPDR initial value | $[95.15] |
| Put Option Premium | $[13.80] (12.67% of SPDR initial value) |
| PROTEQTS initial price | $[108.95] |
| Put Option Strike | $[108.95] (114.5% of SPDR initial value) |

In another embodiment, the present invention may provide principal-protected exposure to one or more equity markets for any desired span of time (e.g., long dated to 10 years).

In another embodiment of the present invention the following offering restrictions may apply:

The Trust Certificates may be sold in a private placement under Section 4(2) of the Securities Act of 1933 (the "Securities Act").

The Investor may be required to represent that it is: (i) "institutional accredited investors" as defined in Regulation D under the Securities Act; and (ii) "qualified purchasers" under Section 3(c)(7) of the Investment Company Act of 1940 (the "Investment Company Act").

Any subsequent purchaser of the Trust Certificates may be required to make the same purchaser representations.

The Trust Certificates may be in physical form and may be transferable with a stock power.

In another embodiment of the present invention the following documentation may apply:

Offering Document: The overall description of the Trust Certificates and documentation may be contained in a Private Placement Memorandum ("PPM") which may also contain detailed tax and ERISA disclosure.

Trust Agreement: May contain the legal terms of the Trust Certificates and may incorporate the financial terms from the PPM.

OTC Option Agreement: The terms of the Put Options may be contained in an OTC Options Agreement between the entity selling the put option and the Trust.

Opinions: The documentation may include opinions of outside counsel as to the validity of the Trust Certificates and the availability of exemptions under the Securities Act, Investment Company Act and/or the Trust Indenture Act.

In another embodiment of the present invention the following FAS 133 treatment may apply:

The Investor may acquire a majority of certificates in a Trust that owns shares plus a put. The Investor may report the shares and the put on its books as a result of consolidating the Trust. If it classifies the shares as Available for Sale and follows the guidance in DIG issue G20 for the put, it is believed that the Investor should be able to book only dividends received in income together with realized gains/losses on liquidating the portfolio.

The Investor may own up to 100% of the Trust certificates in a vehicle that is not a QSPE from its perspective.

The Investor may therefore need to consolidate the vehicle onto its financial statements as it will likely be the Primary Beneficiary/own a controlling financial interest.

The Investor may report the Equity security as an Available for Sale asset. Changes in its value may be recorded in Other Comprehensive Income ("OCI") until sold, absent an "Other than Temporary" impairment.

It is believed that the put would be designated as a hedge of the security under FAS 133

It is believed that the optimal treatment would likely be to designate the put option as a cash flow hedge of the forecasted sale of the security in accordance with paragraph 29 of FAS 133, and to follow the guidance in DIG Issue G20.

It is believed that following DIG issue G20 may allow the Investor to treat the put as a perfect hedge. Changes in its value may be recorded in OCI until the shares were sold or until 60 days after the forecasted sale date if the sale did not occur by then. If the forecasted sale fails to occur, the Investor may need to consider that fact in future cash flow hedge strategies.

While there are a number of criteria that the Investor may need to satisfy in order to follow G20, it is believed that a key issue will be whether the Investor and its auditors can conclude at the outset that the forecasted sale is probable on the date that the put expires.

In appropriate circumstances, this requirement could be satisfied by both intent and representation by management in authority that they will sell the securities on that date and not earlier or later.

The existence of the Trust, the designation of the certificates as Held to Maturity for Regulatory Accounting purposes and a requirement in the Trust documents that the Trust assets be liquidated at maturity may be helpful in this regard.

Alternatively, some auditors may not feel this is convincing if the Investor owns 100% of the Trust certificates as it could unilaterally dissolve or amend the Trust. They may require a third party imposed restriction.

This could be satisfied by having an unrelated third party own a blocking piece of the Trust certificates such that the Investor would not be able to unilaterally dissolve or amend the Trust.

It is believed that the entity selling the put option should not fulfill the role of unrelated third party as such entity may be viewed as a captive of the Investor with respect to liquidation of the Trust.

Other criteria needed to assume time value is effective under G20 include:

The derivative is a European-style purchased option;

The exposure being hedged is the variability in expected future cash flows attributed to a hedge of the variability in sales proceeds attributable to a stock price below X the strike; and Effectiveness will be assessed based on total changes in the option's cash flows.

In another embodiment of the present invention the following statutory accounting treatment for insurance companies may apply:

The NAIC Securities Valuation Office (SVO) has classified the PROTEQTS (particularly for long dated PROTEQTS) as redeemable preferred stock (RP1).

It is believed that insurance regulators will likely treat RP1 as securities that are valued at amortized cost and recorded on Schedule D of the NAIC Annual Statement.

It is believed that the NAIC risk based capital charge for RP1 securities is 0.9% of statement value.

In another embodiment of the present invention the following tax treatment may apply:

Anticipated Tax Treatment:

It is believed that ownership of a PROTEQTS may be taxed as an undivided ownership interest in the SPDR shares and the Put, rather than as a "contingent payment debt instrument" as the term is defined in Treasury regulations. In such case:

It is believed that the cost basis in the SPDR shares and the Put generally would equal their purchase price; and It is believed that the option premium paid by the Trust generally would be treated as a capital expense.

Application of Special Tax Rules

The short-sale rules, which affect the character and timing of gain and loss, may apply to the PROTEQTS. In addition, the straddle rules may apply. The consequences of the application of these rules could include, among other things:

No holding period in the SPDR shares or the Put;

Interest allocable to the SPDR shares or the Put subject to capitalization; and

Deferral of certain loss recognized in respect of straddle property.

The dividends-received deduction may be unavailable in respect of distributions on the SPDR shares representing dividends paid by constituents of the S&P 500 Index.

Capital losses may also be subject to other limitations on use.

Sale of the PROTEQTS

The Investor would recognize gain or loss on a sale of the PROTEQTS.

The Investor may be required to allocate the proceeds from such sale to its deemed undivided ownership interest in the SPDR shares and the Put based on relative fair market values and compute gain or loss separately with respect to each item of property.

Of note, the method embodiments described herein may, of course, be implemented using any appropriate computer hardware and/or computer software. In this regard, those of ordinary skill in the art are well versed in the type of computer hardware that may be used (e.g., a mainframe, a mini-computer, a personal computer ("PC"), a network (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

While a number of embodiments of the present invention have been described, it is understood that these embodiments are illustrative only, and not restrictive, and that many modifications may become apparent to those of ordinary skill in the art. For example, certain methods have been described herein as being "computer implementable". In this regard it is noted that while such methods can be implemented using a computer, the methods do not necessarily have to be implemented using a computer. Also, to the extent that such methods are implemented using a computer, not every step must necessarily be implemented using a computer. Further, the present invention may utilize a plurality of trust certificates and/or a plurality of equity securities and/or a plurality of put options. Further still, while the invention has been described principally with respect to one investor, one trust, one put option seller and one equity market, any number of investors and/or trusts and/or put option sellers and/or equity markets may be involved. Further still, the invention may utilize securities other than equity securities.

What is claimed is:

1. A computer implemented method for performing data processing operations associated with providing principal protection exposure to an equity market, comprising:
    conducting via a computerized system a sale of a trust certificate to generate proceeds, wherein the sale is from a trust to a first entity;
    allocating a portion of the proceeds of the sale of the trust certificate to a purchase of an equity security, which purchase is by the trust from the equity market;
    purchasing the equity security with the allocated portion of the proceeds of the sale of the trust certificate, wherein the purchase is made by the trust from an equity market;
    allocating a portion of the proceeds of the sale of the trust certificate to a purchase of a put option on the equity security, which purchase is by the trust from a second entity;
    purchasing the put option with the allocated portion of the proceeds of the sale of the trust certificate, wherein the purchase is made by the trust from a second entity based on the details associated with the purchase of the equity security; and
    providing the first entity with principal protection exposure to the equity market without causing substantial income statement volatility based on the sale of the trust certificate to the first entity, wherein the trust certificate provides the first entity with an interest in the trust, wherein the trust invests the trust certificate proceeds in the purchase of the equity security and the purchase of the put option based on the details associated with the purchase of the equity security.

2. The method of claim 1, wherein the principal protection exposure is provided to the first entity with substantially no income statement volatility.

3. The method of claim 1, wherein substantially all of the proceeds of the sale of the trust certificate are allocated between the purchase of the equity security and the purchase of the put option on the equity security.

4. The method of claim 1, further comprising structuring the trust.

5. The method of claim 4, wherein substantially all of the proceeds of the sale of the trust certificate are allocated among the purchase of the equity security, the purchase of the put option on the equity security, and formation and administration costs associated with the trust.

6. The method of claim 5, further comprising structuring the trust as a trust selected from the group including: (a) a limited purpose Delaware business trust; and (b) a limited purpose New York business trust.

7. The method of claim 6, further comprising selecting a trustee for the trust.

8. The method of claim 6, further comprising selecting an independent bank trustee to serve as trustee for the trust.

9. The method of claim 1, wherein the equity security is an SPDR share.

10. The method of claim 1, wherein the put option is struck at a price that substantially guarantees at least the return of the initial investment by the first entity at the maturity of the put option.

11. The method of claim 10, wherein the put option is an over-the-counter put option.

12. The method of claim 11, wherein the put option is a European-style cash-settling option.

13. The method of claim 1, wherein the steps are carried out in the order recited.

14. A computer-system implemented method for providing principal protection exposure to an equity market, comprising:
    generating, via a computer system, a financial portfolio, comprising:
        a trust certificate, which trust certificate is sold by a trust to a first entity to generate proceeds;
        an equity security, which equity security is purchased by the trust from the equity market using a portion of the proceeds of the sale of the trust certificate; and
        a put option on the equity security, which put option is purchased by the trust from a second entity using a portion of the proceeds of the sale of the trust certificate;
    wherein the trust certificate sold to the first entity, combined with the equity security purchased by the trust and the put option purchased by the trust, results in the first entity with principal protection exposure to the equity market without causing substantial income statement volatility; and providing, via the computer system, the first entity with principal protection exposure to the equity market based on the generated financial portfolio without causing substantial income statement volatility based on the sale of the trust certificate to the first entity, wherein the trust certificate provides the first entity with an interest in the trust, wherein the trust invests the trust certificate proceeds in the purchase of the equity security and the purchase of the put option based on the details associated with the purchase of the equity security.

15. The method of claim 14, wherein the principal protection exposure is provided to the first entity with substantially no income statement volatility.

16. The method of claim 14, wherein substantially all of the proceeds of the sale of the trust certificate are allocated between the purchase of the equity security and the purchase of the put option on the equity security.

17. The method of claim 14, wherein substantially all of the proceeds of the sale of the trust certificate are allocated among the purchase of the equity security, the purchase of the put option on the equity security, and formation and administration costs associated with the trust.

18. The method of claim 14, wherein the trust is selected from the group including: (a) a limited purpose Delaware business trust; and (b) a limited purpose New York business trust.

19. The method of claim 14, wherein an independent bank trustee serves as trustee for the trust.

20. The method of claim 14, wherein the equity security is an SPDR share.

21. The method of claim 14, wherein the put option is struck at a price that substantially guarantees at least the return of the initial investment by the first entity at the maturity of the put option.

22. The method of claim 21, wherein the put option is an over-the-counter put option.

23. The method of claim 22, wherein the put option is a European-style cash-settling option.

24. A system for providing principal protection exposure to an equity market, comprising:
a memory;
a processor disposed in communication with said memory, said memory storing processor-executable instructions issuable by said processor to:
conduct a sale of a trust certificate to generate proceeds, wherein the sale is from a trust to a first entity;
allocate a portion of the proceeds of the sale of the trust certificate to a purchase of an equity security, which purchase is by the trust from the equity market;
purchase the equity security with the allocated portion of the proceeds of the sale of the trust certificate, wherein the purchase is made by the trust from an equity market;
allocate a portion of the proceeds of the sale of the trust certificate to a purchase of a put option on the equity security, which purchase is by the trust from a second entity;
purchase the put option with the allocated portion of the proceeds of the sale of the trust certificate, wherein the purchase is made by the trust from a second entity based on the details associated with the purchase of the equity security; and
provide the first entity with principal protection exposure to the equity market without causing substantial income statement volatility based on the sale of the trust certificate to the first entity, wherein the trust certificate provides the first entity with an interest in the trust, wherein the trust invests the trust certificate proceeds in the purchase of the equity security and the purchase of the put option based on the details associated with the purchase of the equity security.

25. A computer-readable storage medium storing computer-executable instructions, said computer-executable instructions issuable by a processor to:
conduct a sale of a trust certificate to generate proceeds, wherein the sale is from a trust to a first entity;
allocate a portion of the proceeds of the sale of the trust certificate to a purchase of an equity security, which purchase is by the trust from the equity market;
purchase the equity security with the allocated portion of the proceeds of the sale of the trust certificate, wherein the purchase is made by the trust from an equity market;
allocate a portion of the proceeds of the sale of the trust certificate to a purchase of a put option on the equity security, which purchase is by the trust from a second entity;
purchase the put option with the allocated portion of the proceeds of the sale of the trust certificate, wherein the purchase is made by the trust from a second entity based on the details associated with the purchase of the equity security; and
provide the first entity with principal protection exposure to the equity market without causing substantial income statement volatility based on the sale of the trust certificate to the first entity, wherein the trust certificate provides the first entity with an interest in the trust, wherein the trust invests the trust certificate proceeds in the purchase of the equity security and the purchase of the put option based on the details associated with the purchase of the equity security.

\* \* \* \* \*